(12) United States Patent
Cheng

(10) Patent No.: US 6,373,601 B1
(45) Date of Patent: Apr. 16, 2002

(54) IMAGE SCANNER

(75) Inventor: Long-Song Cheng, Hsinchu (TW)

(73) Assignee: Microtek International, Inc., Hsinchu (TW)

( * ) Notice: Subject to any disclaimer, the term of this patent is extended or adjusted under 35 U.S.C. 154(b) by 0 days.

(21) Appl. No.: 09/251,339

(22) Filed: Feb. 17, 1999

(51) Int. Cl.⁷ .................................................. H04N 1/04
(52) U.S. Cl. ...................................... 358/474; 358/496
(58) Field of Search ................................. 358/474, 475, 358/400, 486, 493, 496, 494, 497; 382/312

(56) References Cited

U.S. PATENT DOCUMENTS 5,717,982 A * 2/1998 Statt ........................... 399/126
5,844,695 A * 12/1998 Suzuki ........................ 358/475
6,169,611 B1 * 1/2001 Brook III, et al. ........... 358/487
6,250,731 B1 * 6/2001 Hashimoto ..................... 347/8

* cited by examiner

Primary Examiner—Jerome Grant, II
(74) Attorney, Agent, or Firm—Bacon & Thomas

(57) ABSTRACT

An image scanner employs sliding elements to keep a regular depth of field between a scanning module and a scanned object. The image scanner comprises a housing, a scanning plate for holding scanned object, a plurality of sliding elements, a movable carriage, a scanning module and a driving device. The sliding elements pinch at the both sides of scanning plate and slide freely lengthwise along the scanning plate and the carriage is fixed at the sliding elements. Because the scanning plate is the same reference base for both carriage and scanned object, it is easy to keep the regular distance between carriage and scanned object.

8 Claims, 6 Drawing Sheets

IMAGE SCANNER

BACKGROUND OF THE INVENTION

The invention relates generally to an image scanner. More specifically, the present invention relates to an image scanner with sliding elements for holding movable carriage and keeping the same depth of field between scanning module and scanned object.

It is well known to use image scanners to translate the image of a scanned object to a corresponding digital image signal. For getting clearly image, it is important to keep the depth of field between the scanning module and the scanned object in steady during scanning. Especially, it is more important for the scanners using the CIS as the optical elements due to its shorter depth of field.

FIG. 1 is a cross-sectional view of an exiting traditional flatbed scanner. The scanner includes a housing 20 having a scanning plate 22 for holding a scanned object, a lid 10 for pressing the scanned object placed on the scanning plate 22, a sliding rod 31 being parallel to scanning plate 22 in lengthwise direction inside the housing 20, a movable carriage 40, a scanning module (not shown, including a CCD or CIS, a light source, a lens) in the carriage 40 for translating optical image signal to digital signal, and a driving device 32 for driving carriage 40 to move along the sliding rod 31.

According to the scanner shown in FIG. 1, the sliding rod 31 has to be assembled carefully. Then, the distance between the carriage 40 and the scanned object can be certainly kept. However, there are many uncertainties in the manufacture and setting process, so the adjustment becomes difficult. Those make the unsteady distance between carriage 40 and scanned object. Those uncertainties bring the unacceptable quality of scanning image, especially for the scanner with CIS.

SUMMARY OF THE INVENTION

The present invention is directed to improve the unsteady distance between the scanning module and the scanned object.

One aspect of the present invention is directed to an improved adjustment and manufacture's problems caused by having different reference bases of the carriage and the scanned object.

In the present invention, there is a new art disclosed. The scanning plate is the reference base for the scanning module when the carriage is moving. The art provides a plurality of sliding elements which sliding at the both sides of the scanning plate. Then, the carriage is fixed at the sliding elements and sliding with sliding elements. Therefore, the scanning module located at the carriage can stay in a predefined distance from the scanned object when the carriage is moving along the scanning plate. Besides keeping the depth of field between the scanning module and the scanned object, the sliding elements avoid the complex adjustments while assembling the scanner.

The second aspect of the present invention is to reduce the complication of driving mechanism and to easy the assembling. For decreasing the complication of driving mechanism, the present invention is to mount a driving device (e.g. electric motor, gears set etc.) on the carriage and has a rack on the housing. Because one of the gears of the driving device engages with the rack on housing, when the motor is actuated, the carriage is moves along the scanning plate.

A further understanding of the nature and advantages of the invention is realized by reference to the remaining portion of the specification and the drawings.

DETAIL DESCRIPTION OF THE PREFERRED EMBODIMENT

Figure 1:
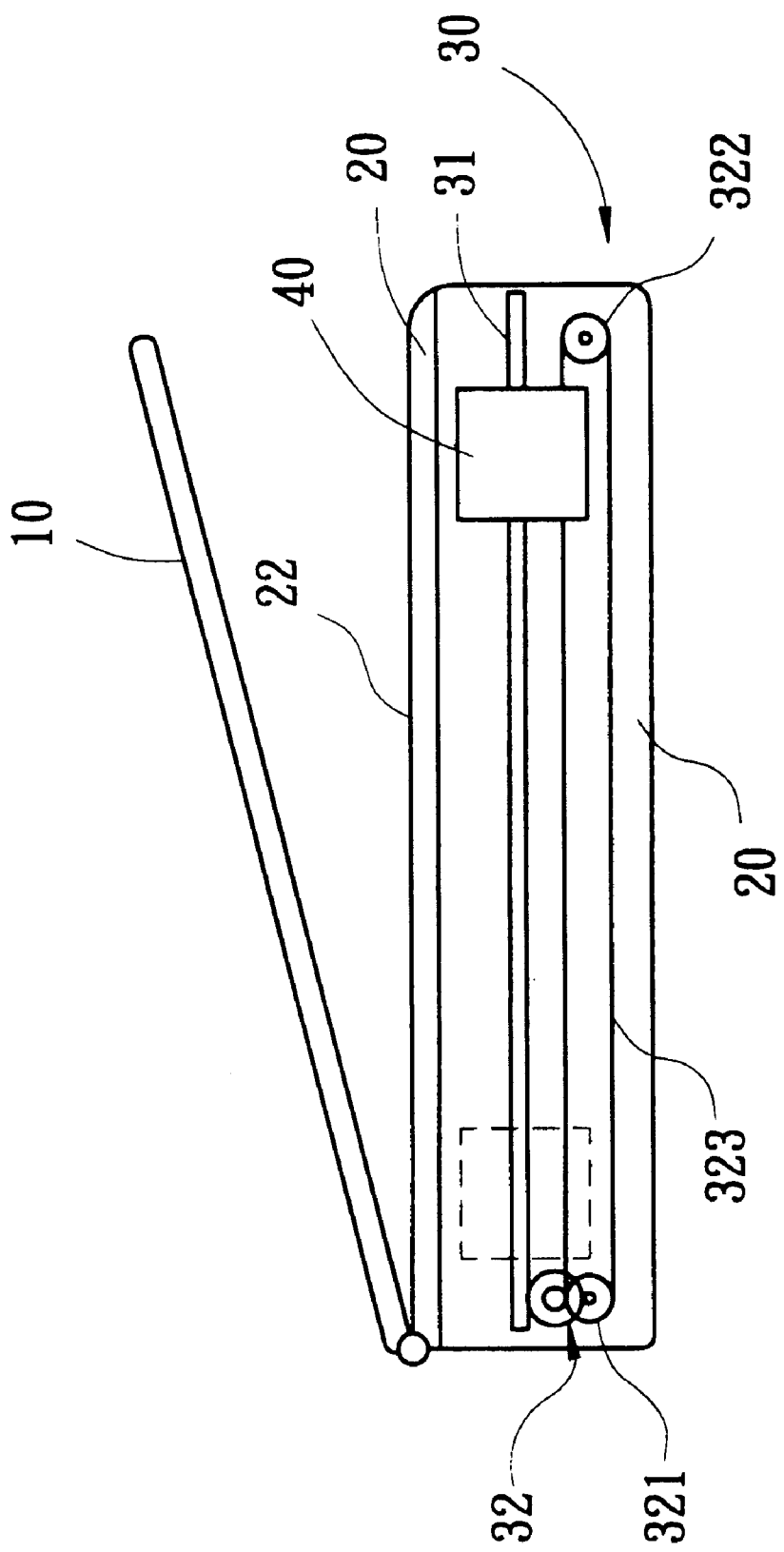
FIG. 1 is a cross-sectional view of a traditional flatbed scanner.
Figure 2:
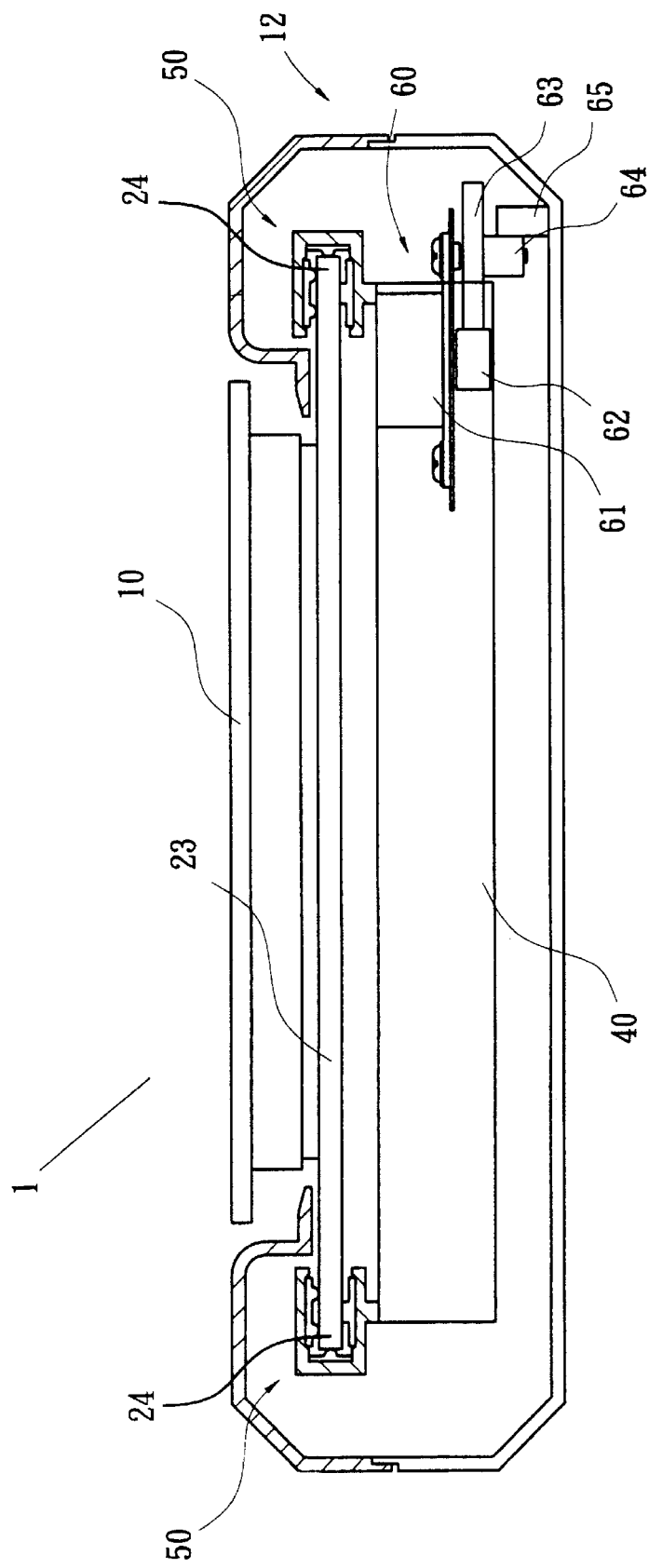
FIG. 2 is a cross-sectional view of the first kind of embodiment according to the present invention.

FIG. 2 shows a cross-sectional view of the first kind of embodiment image scanner 1 of the present invention. The image scanner 1 comprises a housing 12, a scanning plate 23 for holding a scanned object, sliding elements 50 pinching at the both sides 24 of the scanning plate 23, a carriage 40 fixed on the sliding elements 50, and a driving device 60 for driving the carriage 40. The scanner 1 further comprises a lid 10 for pressing the scanned object placed on the scanning plate 23.

Figure 4:
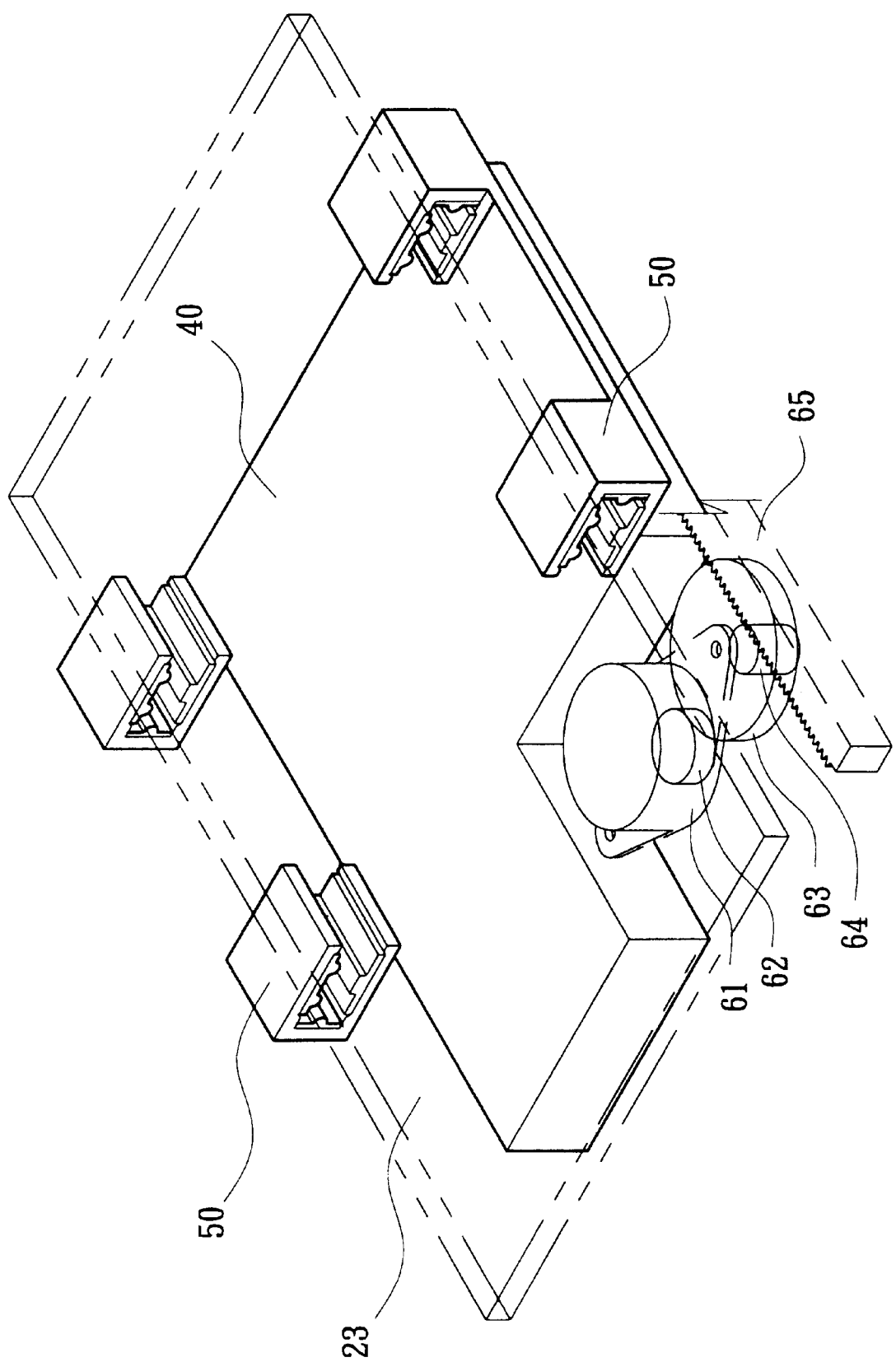
FIG. 4 is a perspective view of the first embodiment according to the present invention.

According to FIG. 4, the scanning plate 23 has a smooth flat surface for holding a scanned object and is better to be made by glass material, but it can also be made by transparent materials like plastic. As shown in FIG. 2, there is a stretch-out edge 24 in each side of the scanning plate 23 and the sliding elements 50 pinch movably with the stretch-out edges 24. Therefore, the sliding elements 50 are able to move front and back along stretch-out edges 24. Furthermore, the carriage 40 is fixed on the sliding elements 50, therefore the distance between the carriage 40 and the scanned object on scanning plate 23 is kept by the combination of stretch-out edges 24 and sliding elements 50. The carriage 40 is fixed on the sliding elements by screws, or by inserting the pins at carriage 40 into the holes at sliding elements 50.

Figure 5:
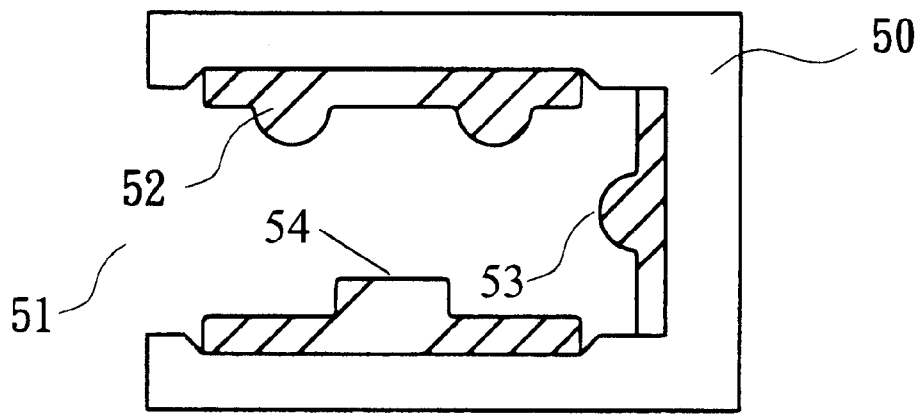
FIG. 5 is a cross-sectional view of sliding element of FIG. 2.

FIG. 5 shows a cross-sectional view of the sliding element 50. The sliding element 50 is shaped like "C" and the open 51 is pinched by the stretch-out edges 24 of scanning plate 23. When sliding elements 50 is pinched at stretch-out edges 24 of scanning plate 23, because the carriage 40 is fixed on those sliding elements 50, those sliding elements 50 will not be separated from the scanning plate 23. Furthermore, for smoothly sliding at the stretch-out edges 24 of scanning plate 23, there is a plurality of contact elements 52, 53, and 54 with small coefficient of friction on each inside surface of sliding elements for contacting with scanning plate 23.

Figure 6:
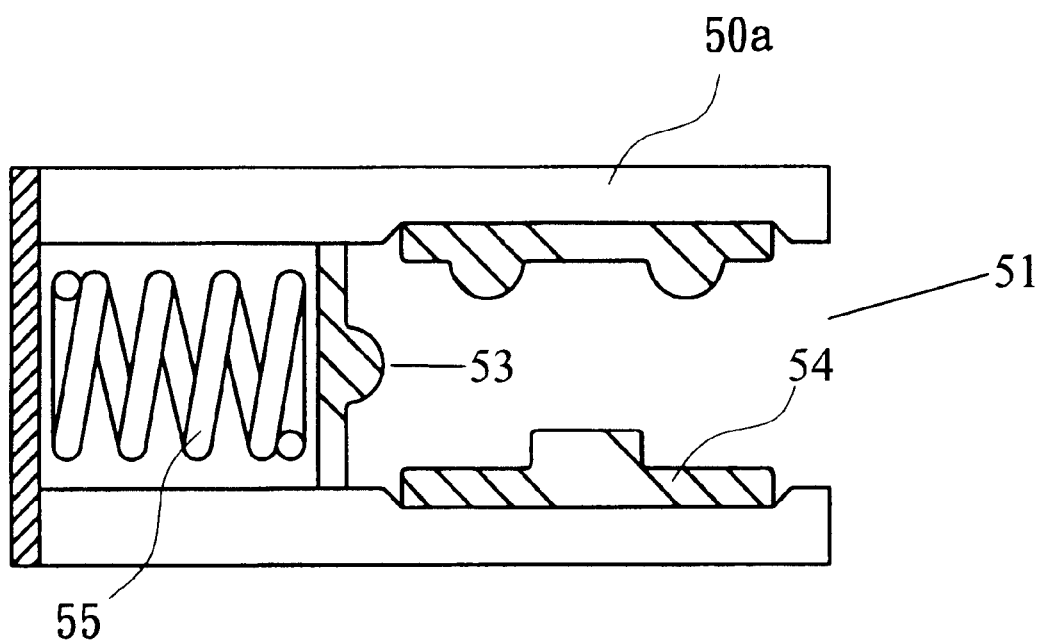
FIG. 6 is a cross-sectional view of a sliding element with a damper.
Figure 7:
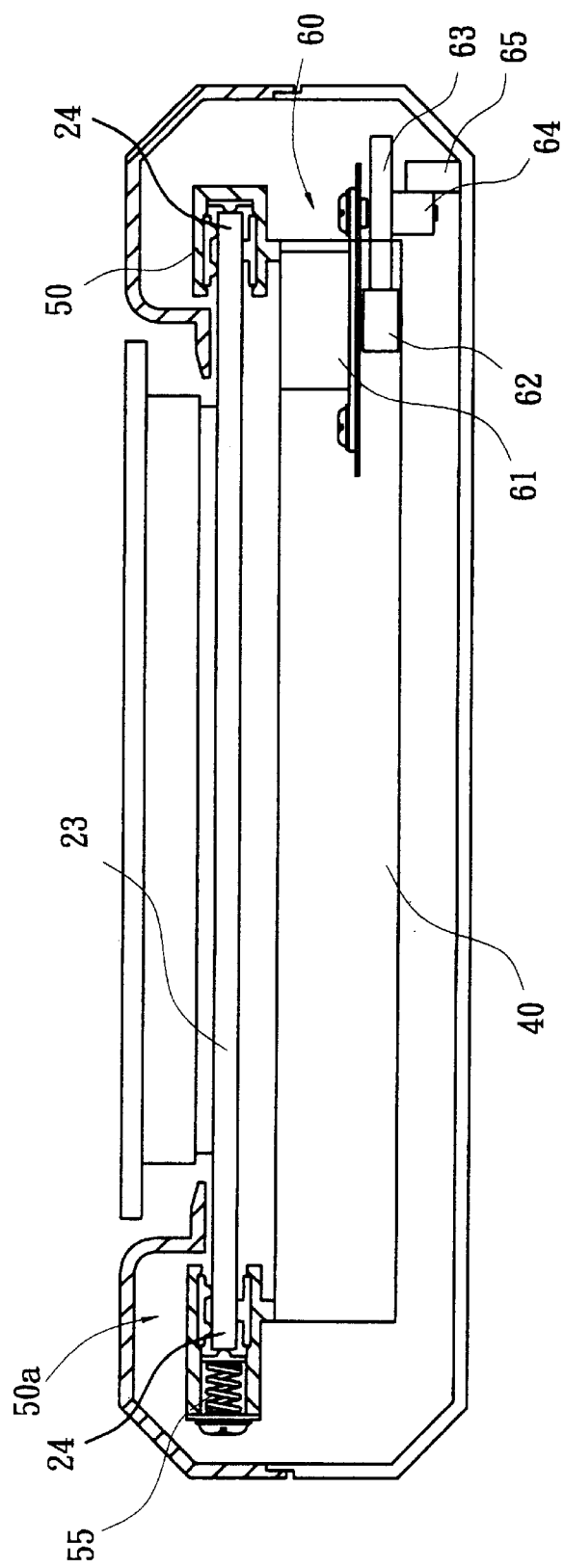
FIG. 7 is a cross-sectional view of the second kind of embodiment, according to the present invention.

FIG. 6 illustrates the second embodiment of sliding element 50a. The sliding elements 50a has the same shape "C" and same contact elements 52, 53 and 54, and further has a flexible damper 55 (e.g. spring, flexible elements etc.) in one side. The damper 55 is inserted between the side wall and the contact element 53 of sliding element 50a. The contact element 53 is against the side surface of scanning plate 23, and by the spring force the contact element 53 absorbs the width tolerance of scanning plate 23 and reduces the torque while moving of carriage 40. Furthermore, damper 53 makes carriage 40 to keep away from floating at widthwise, which will damage the scanning quality when the scanner is working. FIG. 7 illustrates a cross-sectional view of sliding element 50a with damper 53.

Carriage 40 is mounted on the undersides of sliding elements 50 and keeps a predefined distance from the scanning plate 23. Because the carriage 40 is fixed at sliding elements 50, the carriage 40 is moved by driving device 60 along the lengthwise direction of scanning plate 23.

Figure 3:
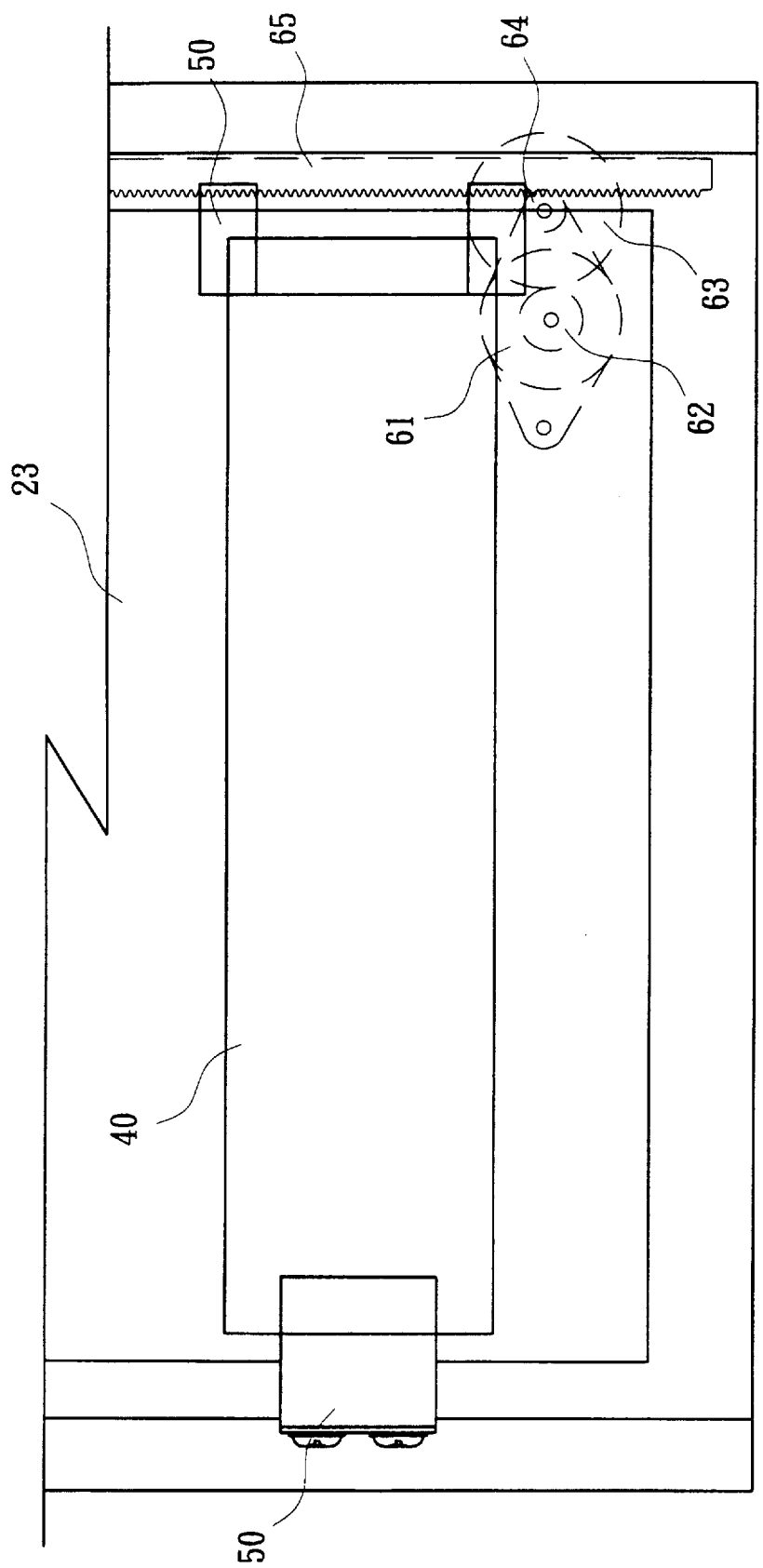
FIG. 3 is a cut-away top view of the first kind of embodiment according to the present invention.

As shown in FIG. 2, FIG. 3, and FIG. 4, the driving device 60 includes motor 61, gears set 62, 63, 64, and rack 65. The motor 61 and gears set 62, 63, 64 are fixed on carriage 40 and the rack 65 is fixed on the housing 12. The rack 65 can also be a part of housing and is formed by plastic. The gear set 62, 63, 64 are engaged with each other. The gear 62 is engaged with the shaft of motor 61 and the gear 64 is engaged with the rack 65.

When the scanner is scanning, the motor 61 is actuated to turn and drives the gears set 62, 63, and 64. Because the gear 64 is engaged with the rack 65, carriage 40 is moved while gear 64 is turning.

Consequently, driving device 60 is not the only way for driving carriage 40. Many variations and equivalents (e.g. using step belt, loop driving device etc. to achieve the same result) will be apparent to those of skill in the art upon reviewing the above description. Therefore, the scope of the invention should be determined with reference to the appended claims, along with the full scope of equivalents to which such claims are entitled.

In the present invention, the sliding elements are pinched at both side of the scanning plate and the carriage is fixed at sliding elements. Because the scanning plate is the reference base for both carriage and scanned object, there is no problem about the adjustment caused by the different reference bases of a scanned object and carriage in the prior art.

It is to be understood that the above description of the preferred embodiments is intended to illustrative and not restrictive. Many variations and equivalents will be apparent to those of skill in the art upon reviewing the above description. The scope of the invention should, therefore, be determined with reference to the appended claims, along with the full scope of the equivalents to which such claims are entitled.

What is claimed is:

1. An image scanner with constant depth of field, comprising:
    a housing with length, width and height;
    a scanning plate mounted on said housing and having a flat surface for holding a scanned object;
    a plurality of sliding elements movably engaging opposite surfaces on both sides of said scanning plate;
    a movable carriage fixed to said sliding elements;
    a scanning module on said carriage, said scanning module having a optical sensor, a lens, and a light source for translating the image of said scanned object into a corresponding digital signal; and
    a driving device for driving said carriage to move along said scanning plate, wherein said image scanner further comprises a lid for pressing said scanned object against said scanning plate.

2. The image scanner as recited in claim 1, wherein said scanning plate has extended edges on said both sides in the direction of a scanning line.

3. The image scanner as recited in claim 2, wherein said sliding elements are shaped like a "C", said extended edges fitting into respective openings in said "C".

4. The image scanner as recited in claim 1, wherein said sliding elements comprise at least one contact element on each inside surface for contacting said extended edges of said scanning plate.

5. The image scanner as recited in claim 4, wherein each said at least one contact element has a small coefficient of friction.

6. The image scanner as recited in claim 1, wherein said sliding elements have a damper inside for absorbing a width tolerance of said scanning plate.

7. The image scanner as recited in claim 6, wherein said damper is a spring.

8. An image scanner with constant depth of field, comprising:
    a housing with length, width and height;
    a scanning plate mounted on said housing and having a flat surface for holding a scanned object;
    a plurality of sliding elements movably engaging opposite surfaces on both sides of said scanning plate;
    a movable carriage fixed to said sliding elements;
    a scanning module on said carriage, said scanning module having a optical sensor, a lens, and a light source for translating the image of said scanned object into a corresponding digital signal; and
    a driving device for driving said carriage to move along said scanning plate, wherein said driving device comprises:
        a motor mounted on said carriage;
        a plurality of gears engaged with each other, one of said gears engaging the shaft of said motor; and
        a rack fixed on said housing and engaged with another gear of said gears.

* * * * *